United States Patent
Maharana et al.

(10) Patent No.: US 9,235,650 B2
(45) Date of Patent: Jan. 12, 2016

(54) EFFICIENT CONVERSION OF XML DATA INTO A MODEL USING PERSISTENT STORES AND PARALLELISM

(71) Applicant: Siemens Product Lifecycle Management Software Inc., Plano, TX (US)

(72) Inventors: Sujit Maharana, Maplewood, MN (US); Douglas Scott Jackson, Forest Lake, MN (US); Subodh Chaubal, Shoreview, MN (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 120 days.

(21) Appl. No.: 13/629,212

(22) Filed: Sep. 27, 2012

(65) Prior Publication Data

US 2014/0089332 A1    Mar. 27, 2014

(51) Int. Cl.
*G06F 7/00* (2006.01)
*G06F 17/30* (2006.01)

(52) U.S. Cl.
CPC .................. *G06F 17/30917* (2013.01)

(58) Field of Classification Search
CPC .......... G06F 12/0862; G06F 17/30911; G06F 17/30923; G06F 17/30908
USPC ......................................... 707/602, 802, 755
See application file for complete search history.

(56) References Cited

U.S. PATENT DOCUMENTS

| | | | |
|---|---|---|---|
| 7,403,940 B2 | 7/2008 | Narsude | |
| 7,680,764 B2 | 3/2010 | Chandrasekar et al. | |
| 7,860,879 B2* | 12/2010 | Gerea et al. | 707/769 |
| 7,975,001 B1* | 7/2011 | Stefansson et al. | 709/203 |
| 8,250,457 B2* | 8/2012 | Fainberg et al. | 715/205 |
| 8,250,464 B2* | 8/2012 | Dang et al. | 715/234 |
| 8,838,626 B2* | 9/2014 | Yu et al. | 707/755 |
| 2007/0299811 A1* | 12/2007 | Chandrasekar et al. | 707/2 |
| 2008/0033974 A1 | 2/2008 | Cameron | |
| 2009/0089658 A1* | 4/2009 | Chiu et al. | 715/234 |
| 2009/0119677 A1* | 5/2009 | Stefansson et al. | 719/313 |
| 2011/0107052 A1* | 5/2011 | Narayanasamy | 711/171 |

* cited by examiner

*Primary Examiner* — James Trujillo
*Assistant Examiner* — Jessica N Le

(57) ABSTRACT

Methods for product data management and corresponding systems and computer-readable mediums. A method includes receiving an XML document by a parallel parser process, the XML document including a plurality of elements of an XML data structure that corresponds to an object model. The method includes dividing the XML document into a plurality of chunks using the parallel parser process, and parsing the plurality of chunks in parallel using separate parsing tasks to produce objects representing the elements and corresponding attributes. The method includes storing the objects and corresponding attributes in a persistent element store.

20 Claims, 4 Drawing Sheets

EFFICIENT CONVERSION OF XML DATA INTO A MODEL USING PERSISTENT STORES AND PARALLELISM

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management, corresponding systems, and computer-readable mediums. A method includes receiving an XML document by a parallel parser process, the XML document including a plurality of elements of an XML data structure that corresponds to an object model. The method includes dividing the XML document into a plurality of chunks using the parallel parser process, and parsing the plurality of chunks in parallel using separate parsing tasks to produce objects representing the elements and corresponding attributes. The method includes storing the objects and corresponding attributes in a persistent element store.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Object model data can be stored and processed as Extensible Markup Language (XML) data. PDM systems that use such XML data must transfer, store, and process very large data structures used to describe object models, which can strain processing, storage, and communications resources. Disclosed embodiments provide systems and methods for efficient conversion of XML data into a model using persistent stores and parallelism. Disclosed systems and methods provide for faster mapping from an XML document into an object model for display in a graphical user interface. Disclosed embodiments provide more efficient processing in any systems that exchange XML documents and display the contents of the documents in a graphical interface. An XML "document" refers to any document, file, or other object that comprises XML data.

Figure 1:
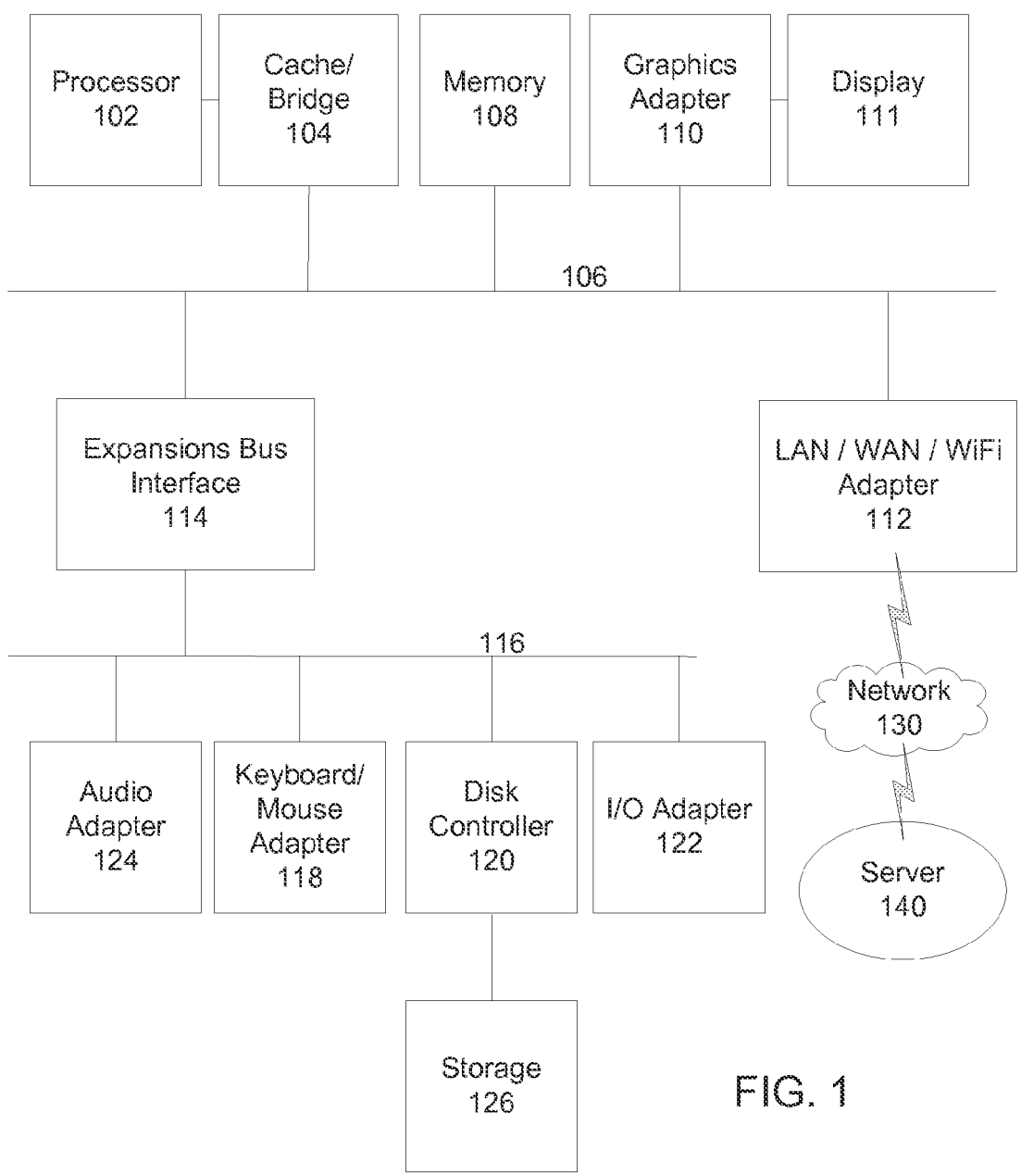
FIG. 1 depicts a block diagram of a data processing system in which an embodiment can be implemented.

FIG. 1 depicts a block diagram of a data processing system in which an embodiment can be implemented, for example, as a PDM system particularly configured by software or otherwise to perform the processes as described herein, and in particular, as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111. In interest of clarity, only one block is used to represent processor 102, but in various embodiments the processor 102 can represent multiple processors, and each processor may have multiple processing cores, each of which can process a thread independently.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 126, in various embodiments, is a fast persistent storage.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In a PDM system, object models, such as 3D models of simple or complex assemblies, can be described using XML data and stored in large XML data structures, generally in a "tree" structure of parent nodes, child nodes, and leafs. When these structures are accessed or transferred between systems, the structure is traversed and each element of the structure (or any of those that correspond to a portion being transferred) is transferred in an XML input to the receiving system or process. The receiving system or process can then construct the object model from the XML input, and can store the constructed object model.

Figure 2:
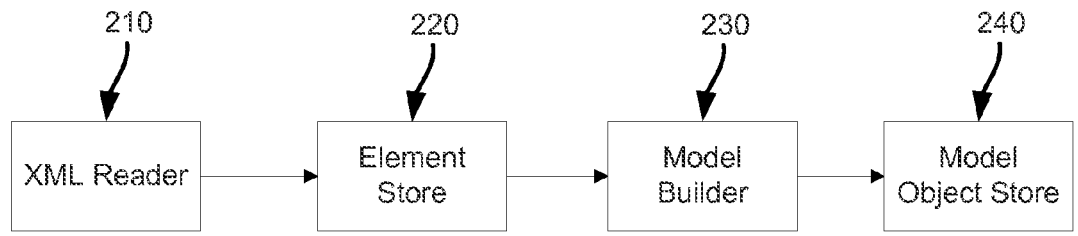

FIG. 2 shows an example of a process flow. XML reader 210 reads the XML document and moves each element to an element store 220. Element store 220 may be maintained in memory, consuming a significant amount of resources. Model builder 230 reads from the element store 220 to build the object model, and then stores the object model in model object store 240.

Such processes can consume a large amount of memory and processing power in the process of receiving and translating the XML streams and creating the object model. In other systems, the entire transferred structure must be stored in memory and processed as a whole to account for interdependencies in the data. While the particular examples below relate specifically to PDM object model data, those of skill in the art will recognize that these techniques can be applied in other systems that transfer and process large amounts of XML data.

Disclosed embodiments improve user response times and reduce the amount of memory needed for loading XML documents by exploiting parallelism and moving XML data that is not currently referenced by the application to a persistent store. Breaking the XML input into a set of XML input streams and processing each of the input streams separately in different processes, and preferably by different processors, takes advantage of computer hardware containing multiple processors.

Each processor of the computer can process part of the XML data at the same time as other processors are processing other parts, so that multiple XML data portions are processed in parallel. Within the XML document, the XML fragments frequently reference other fragments, so this interdependency must be resolved. In order to traverse those relationships in an efficient manner, the system can maintain a lookup table to find the referenced fragments. Further, rather than maintaining the entire XML and lookup table in memory, the system stores this information in a database or similar persistent storage.

When processing the XML and traversing relationships between XML fragments, the system can retrieve the XML fragments from the persistent storage rather than traversing the XML or using an in-memory lookup table.

An event-based XML parser can be used so that, rather than building a large representation of the XML document in memory, the parser fires events when parsing of XML elements is started and completed allowing the application to process fragments of the XML as they are parsed. The fragments can be immediately stored into the persistent storage and need not be stored in memory.

The XML fragments can be persisted into a database using, for example, the Java® persistence architecture. The XML fragments are identified by unique identifiers in the XML and those become the primary keys in the persistent store. When resolving references in the XML the unique identifiers are used to find the appropriate entry in the persistent store. Objects representing the elements and attributes of the XML are stored in this persistent element store and later retrieved in order to extract XML information necessary to build the model.

Figure 3:
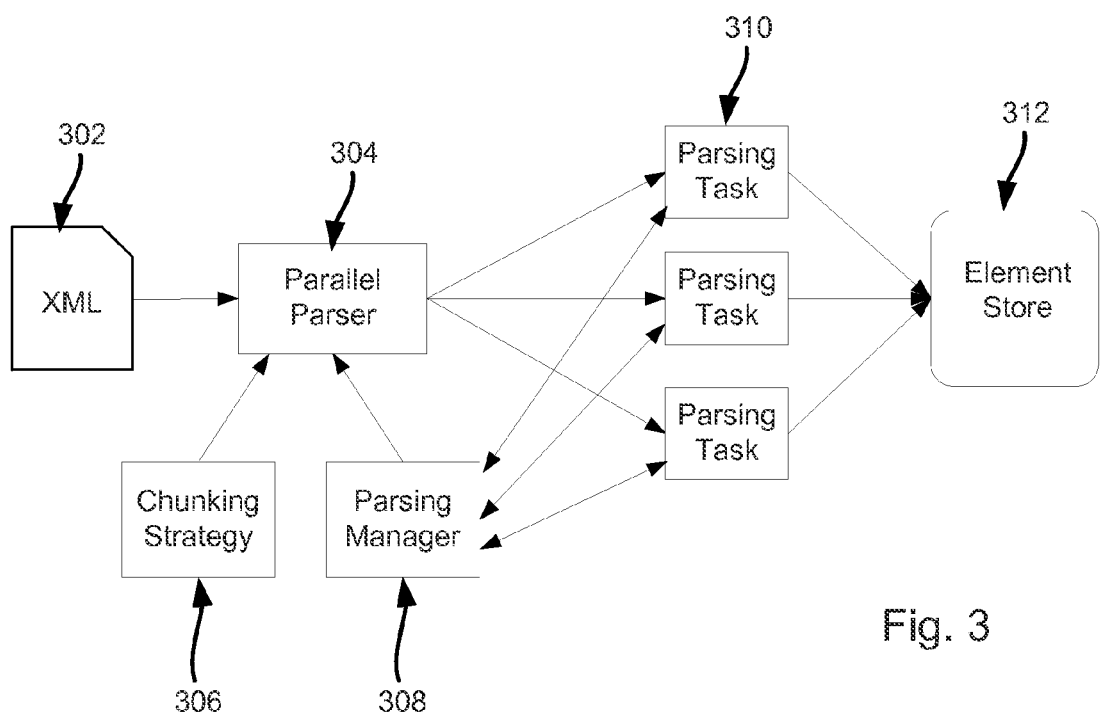
FIGS. 3 and 4 depict examples of a flow diagrams in accordance with disclosed embodiments.

FIG. 3 depicts an example of a flow diagram in accordance with disclosed embodiments.

In this example, the XML data 302 is broken into a set of chunks by a parallel parser 304, by dividing the XML file into equal parts based on the desired level of parallelism; in other embodiments, the chunk sizes are not necessarily of equal size. As part of this process, parallel parser 304 can identify division points in the XML data; the parser searches for the nearest spot in the XML where it can be split and broken into a separate document. This can typically be the end of a tag that is directly under the root element.

Any event based parser such as the Streaming API for XML (STAX) or the Simple API for XML (SAX) can be used to parse the chunks once they are split apart. As the STAX or SAX events occur, the system creates persistent storage entries to represent the information contained in the XML. The Java Persistence Architecture provides a good mechanism for persisting the XML information. The XML must contain a unique identifier that will allow references to the XML parts to be resolved. Once enough database entries have been created, processing of the entries can commence. This parsing works best for XML that is flatter (the ratio of direct children of the root element to elements that are not is high) this is due to the fact that the root element is replicated in each of the parts of the XML that are split apart.

The parallel parser 304 uses a chunking strategy 306 to determine the number of chunks, the size of each chunk, and the order in which they will be processed. Since the end of the $n^{th}$ chunk is the start of the $(n+1)^{th}$ chunk and the chunks are done in parallel, care must be taken so that the determination of the chunk boundaries is done serially. So, if the $n^{th}$ chunk is determining its end point, then the $(n+1)^{th}$ chunk needs to wait for it to complete and use its determined value+1 for its starting point. To avoid threads blocking during the determination of start and end points, it is best to process non-adjacent chunks first. The default chunking strategy does that. The default chunking strategy also takes into account the number of processors on the machine, and a minimum chunk size to prevent chunks which are too small from being created.

The parallel parser 304 also uses a parsing manager 308 which determines when parsing is complete and whether a particular tag is valid for starting the next chunk in the XML. In disclosed embodiments, a valid tag is a tag which appears in the sequence of the complex content of the root tag. For applications where the XML is being searched for a particular tag or content, the parsing manager 308 can indicate completion when the content was found or all chunks were parsed. For applications where the XML is being processed in entirety, then the parsing manager 308 can indicate completion when all chunks are parsed.

One or more parsing tasks 310 are implemented by the threads that parse the XML, and they interact with the parsing manager 308 for managing completion. A parsing task factory interface can be used for instantiating parsing tasks 310 as needed by the parallel parser 304. If the parsing task 310 is thread safe, a single task could be used for many threads—the manager can manage the creation and reuse of the parsing tasks 310. As described herein, it is often preferable to maintain each parsing task 310 on a different processor 102 of the system or on different processor cores.

As the parsing tasks 310 process each XML chunk, they store the processed XML in element store 312 as XML elements and corresponding attributes. Element store 312 is preferably a persistent storage.

Figure 4:
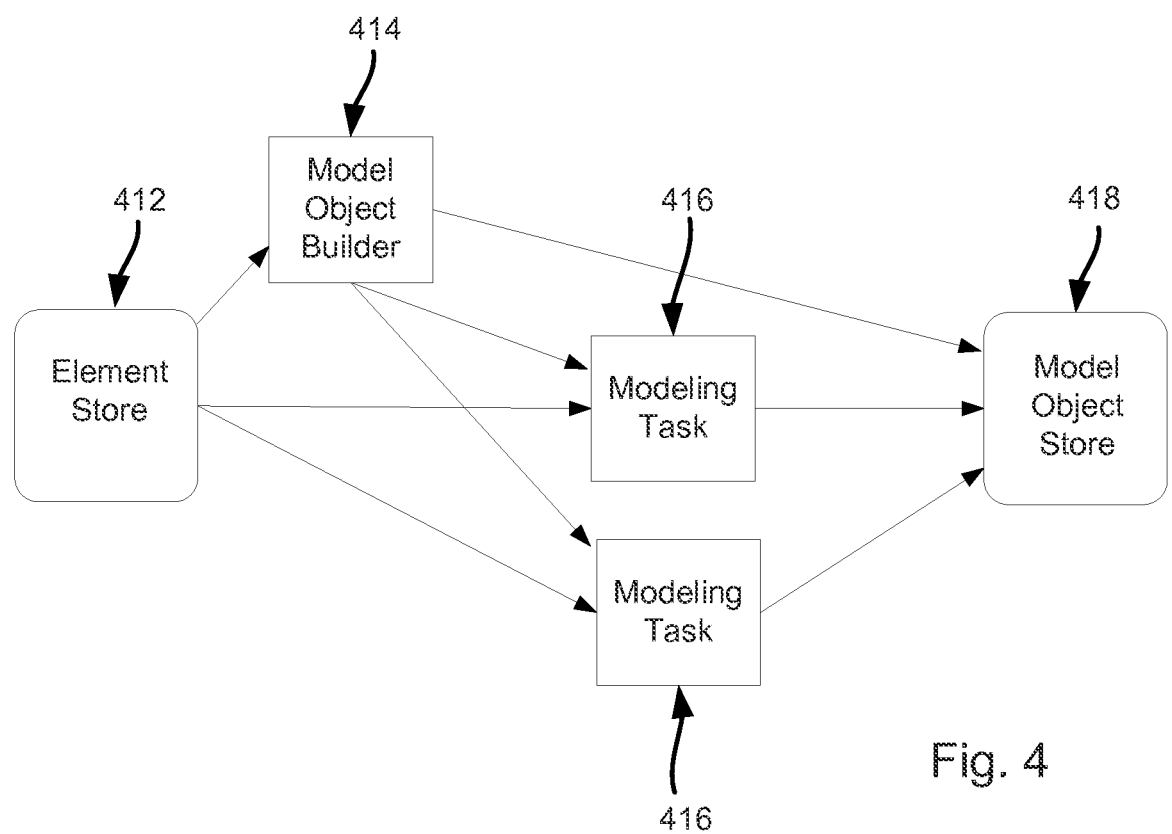

FIG. 4 depicts an example of a flow diagram in accordance with disclosed embodiments. In this example, elements store 412 represents a storage into which the processed XML chunks were stored, such as element store 312.

The model object builder 414 uses the element store 412 created when parsing the XML to access the XML elements and corresponding attributes and creates the minimal starting structure in model object store 418 before starting the rest of the model building background tasks, illustrated here as one or more modeling tasks 416. Modeling tasks 416 can act in parallel, under the control of model object builder 414, to retrieve data from element store 412, build the model objects, and store them in the model object store 418. The model objects stored in model object store 418 together represent one or more models.

The model stored in model object store 418 can be built using software such as the Java® Persistence Architecture software, backed up with a database on the file system so that the parts of the model not currently in use can be removed from memory as needed. The hierarchical portions of the model track whether their children are populated and the model traversal can be performed exclusively with the use of a visitor which knows whether to wait for the children to be populated or not. In this fashion, access to the incomplete model can be provided while the model is populated in other threads.

For example, the top levels of the structure can be displayed in a GUI while the lower levels of the structure are being populated in the background. If the user navigates to a part of the structure that is not yet constructed, the system can block access while waiting for the structure to be constructed. The visitor follows a standard visitor design pattern, except for the traversal logic which can be centralized to a single implementation. The visitor also avoids the use of recursion so that except for the current object being visited, the rest of the structure is not referenced on the execution stack.

Figure 5:
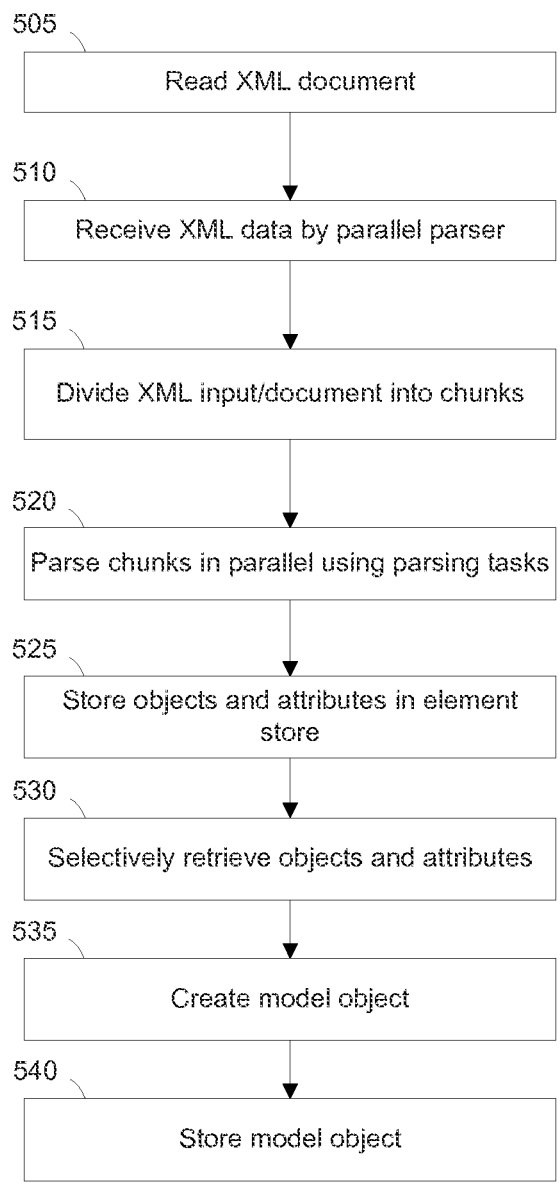
FIG. 5 depicts a flowchart of a process in accordance with disclosed embodiments.

FIG. 5 depicts a flowchart of a process in accordance with disclosed embodiments. The process can be performed, for example, by a PDM data processing system including one or more data processing systems 100.

The system can read an XML document, or other data, corresponding to at least one object model (step 505). This can be performed by an XML reader process.

The system receives the XML data by a parallel parser process (step 510). In embodiments where the system is performing step 505, the parallel parser process can receive the XML data from the XML reader process. In other embodiments, the parallel parser process can receive the XML data from another device or process, or otherwise.

The system divides the XML data into a plurality of chunks (or "streams") using the parallel parser process (step 515). The chunks can be of equal size, and the division can be performed based on division points in the XML data identified by the parallel parser process.

This step can be performed by the parallel parser using a chunking strategy to determine the number of chunks, size of each chunk, and the order in which the chunks are processed, as described in more detail above.

The system parses each of the chunks, including parsing a plurality of chunks in parallel using separate, and preferably independent, parsing tasks to produce objects representing the XML elements, and corresponding attributes (step 520). In some embodiments, each separate parsing task operates in a single parsing thread in a different processor or processor core. In other embodiments, a single parsing task can process multiple parsing threads. In some embodiments, where Java® techniques are used, each parsing task will receive chunks and produce Java® Objects that are stored the step below.

This step can be performed using a parsing manager, as described in more detail above, that that can manage the completion of parsing tasks, instantiate (and kill and reuse) parsing tasks as needed, and can perform other tasks.

The system stores objects representing the XML elements and corresponding attributes in an element store (step 525). The elements store is preferably a persistent storage, and so avoids the problems involved with storing these in dynamic/RAM memory, and the elements are directly stored in the persistent storage.

The system selectively retrieves the XML elements and corresponding attributes from the element store (step 530). The selection can be all of the elements corresponding to a model object, just those elements that correspond to a userselected portion or subassembly of a model object, the elements that correspond to a query, or otherwise.

The system creates one or more model objects from the retrieved XML elements and corresponding attributes using a plurality of modeling tasks operating in parallel (step 535). This step can include controlling the modeling tasks using a model object build process, and can include creating an initial structure in a model object store before starting the modeling tasks.

The system stores the model object in the model object store (step 540). The model object store can also be a persistent store.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 5.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by at least one data processing system and comprising:
    receiving an XML document by a parallel parser process, the XML document including a plurality of elements of an XML data structure that corresponds to an object model;
    dividing the XML document into a plurality of chunks using the parallel parser process according to a chunking strategy comprising a determination of:
        a number of chunks,
        a size of each chunk,
        an order in which the chunks will be parsed,
        an end point of a first chunk of the plurality of chunks, and
        a start point of a second chunk of the plurality of chunks, wherein the start point corresponds to the end point, and
        wherein the chunking strategy avoids processing the second chunk before the determination of the end point of the first chunk by processing non-adjacent chunks before adjacent chunks;
    parsing the plurality of chunks in parallel using separate parsing tasks to produce objects representing the elements and corresponding attributes; and
    storing the objects and corresponding attributes in a persistent element store.

2. The method of claim 1, wherein the data processing system also selectively retrieves the objects and corresponding attributes from the element store;
    creates one or more model objects from the retrieved objects and corresponding attributes using a plurality of modeling tasks operating in parallel; and
    stores the one or more model objects in a model object store.

3. The method of claim 2, wherein the data processing system also controls the modeling tasks using a model object build process, and creates an initial structure in the model object store before starting the modeling tasks.

4. The method of claim 1, wherein the XML document is received from an XML reader process that reads the XML document and passes it to a parallel parser process to produce the plurality of chunks as XML streams.

5. The method of claim 1, wherein the XML document is divided into the plurality of chunks based on division points in the XML document identified by the parallel parser process.

6. The method of claim 1, wherein each parsing task operates in a separate parsing thread in a different processor core.

7. The method of claim 1, wherein the system uses a parsing manager that manages the completion of parsing tasks and instantiates parsing tasks as needed.

8. A data processing system comprising:
    a processor; and
    an accessible memory, the data processing system particularly configured to
        receive an XML document by a parallel parser process, the XML document including a plurality of elements of an XML data structure that corresponds to an object model;
        divide the XML document into a plurality of chunks using the parallel parser process according to a chunking strategy comprising a determination of:
            a number of chunks,
            a size of each chunk,
            an order in which the chunks will be parsed,
            an end point of a first chunk of the plurality of chunks, and
            a start point of a second chunk of the plurality of chunks, wherein the start point corresponds to the end point, and
        wherein the chunking strategy avoids processing the second chunk before the determination of the end point of the first chunk by processing non-adjacent chunks before adjacent chunks;

parse the plurality of chunks in parallel using separate parsing tasks to produce objects representing the elements and corresponding attributes; and store the objects and corresponding attributes in a persistent element store.

9. The data processing system of claim 8, wherein the data processing system also selectively retrieves the objects and corresponding attributes from the element store;

creates one or more model objects from the retrieved objects and corresponding attributes using a plurality of modeling tasks operating in parallel; and stores the one or more model objects in a model object store.

10. The data processing system of claim 9, wherein the data processing system also controls the modeling tasks using a model object build process, and creates an initial structure in the model object store before starting the modeling tasks.

11. The data processing system of claim 8, wherein the XML document is received from an XML reader process that reads the XML document and passes it to a parallel parser process to produce the plurality of chunks as XML streams.

12. The data processing system of claim 8, wherein the XML document is divided into the plurality of chunks based on division points in the XML document identified by the parallel parser process.

13. The data processing system of claim 8, wherein each parsing task operates in a separate parsing thread in a different processor core.

14. The data processing system of claim 8, wherein the system uses a parsing manager that manages the completion of parsing tasks and instantiates parsing tasks as needed.

15. A non-transitory computer-readable medium encoded with executable instructions that, when executed, cause one or more data processing systems to:

receive an XML document by a parallel parser process, the XML document including a plurality of elements of an XML data structure that corresponds to an object model;

divide the XML document into a plurality of chunks using the parallel parser process according to a chunking strategy comprising a determination of:
 a number of chunks,
 a size of each chunk,
 an order in which the chunks will be parsed,
 an end point of a first chunk of the plurality of chunks, and
 a start point of a second chunk of the plurality of chunks, wherein the start point corresponds to the end point, and
 wherein the chunking strategy avoids processing the second chunk before the determination of the end point of the first chunk by processing non-adjacent chunks before adjacent chunks;

parse the plurality of chunks in parallel using separate parsing tasks to produce objects representing the elements and corresponding attributes; and store the objects and corresponding attributes in a persistent element store.

16. The computer-readable medium of claim 15, wherein the data processing system also selectively retrieves the objects and corresponding attributes from the element store;

creates one or more model objects from the retrieved objects and corresponding attributes using a plurality of modeling tasks operating in parallel; and stores the one or more model objects in a model object store.

17. The computer-readable medium of claim 16, wherein the data processing system also controls the modeling tasks using a model object build process, and creates an initial structure in the model object store before starting the modeling tasks.

18. The computer-readable medium of claim 15, wherein the XML document is received from an XML reader process that reads the XML document and passes it to a parallel parser process to produce the plurality of chunks as XML streams.

19. The computer-readable medium of claim 15, wherein the XML document is divided into the plurality of chunks based on division points in the XML document identified by the parallel parser process.

20. The computer-readable medium of claim 15, wherein each parsing task operates in a separate parsing thread in a different processor core and the system uses a parsing manager that manages the completion of parsing tasks and instantiates parsing tasks as needed.

\* \* \* \* \*